United States Patent [19]
White, Jr.

[11] Patent Number: 5,213,593
[45] Date of Patent: May 25, 1993

[54] PRESSURE SWING SORPTION SYSTEM AND METHOD

[75] Inventor: Donald H. White, Jr., Homer, N.Y.
[73] Assignee: Pall Corporation, East Hills, N.Y.
[21] Appl. No.: 953,304
[22] Filed: Sep. 28, 1992

Related U.S. Application Data

[63] Continuation of Ser. No. 845,537, Mar. 4, 1992, abandoned, which is a continuation of Ser. No. 622,279, Dec. 6, 1990, abandoned, which is a continuation of Ser. No. 294,341, Jan. 6, 1989, abandoned.

[51] Int. Cl.$^5$ .................................. B01D 53/04
[52] U.S. Cl. .................................. 55/26; 55/20; 55/28; 55/31; 55/33; 55/62; 55/74; 55/179; 55/208; 55/269; 55/387
[58] Field of Search ............. 55/20, 23, 25–28, 55/31, 33, 62, 74, 75, 179, 208, 267–269, 387, 389

[56] References Cited

U.S. PATENT DOCUMENTS

| | | | |
|---|---|---|---|
| 2,450,289 | 9/1948 | Marek | 55/208 X |
| 2,790,505 | 4/1957 | Dow | 55/33 |
| 2,975,860 | 3/1961 | Westeren | 55/179 |
| 3,237,379 | 3/1966 | Kant et al. | 55/58 |
| 3,274,755 | 9/1966 | Montagnon et al. | 55/171 |
| 3,323,288 | 6/1967 | Cheung et al. | 55/179 X |
| 3,397,511 | 8/1968 | Dwyer et al. | 55/208 X |
| 3,448,561 | 6/1969 | Seibert et al. | 55/33 X |
| 3,513,631 | 5/1970 | Seibert et al. | 55/179 X |
| 3,731,458 | 5/1973 | McGrath, Jr. | 55/33 |
| 3,734,293 | 5/1973 | Biskis | 55/179 X |
| 3,850,592 | 11/1974 | Huffman | 55/33 |
| 3,891,410 | 6/1975 | Hankison | 55/20 |
| 4,026,680 | 5/1977 | Collins | 55/179 X |
| 4,030,896 | 6/1977 | Wimber et al. | 55/33 |
| 4,030,897 | 6/1977 | Petzer et al. | 55/42 |
| 4,087,260 | 5/1978 | Strathoff et al. | 55/28 |
| 4,092,133 | 5/1978 | Kamiya et al. | 55/62 |
| 4,127,395 | 11/1978 | McKey et al. | 55/33 X |
| 4,147,523 | 4/1979 | Izumo | 55/208 |
| 4,162,146 | 7/1979 | Seibert | 55/163 |
| 4,203,734 | 5/1980 | Winter et al. | 55/26 |
| 4,282,015 | 8/1981 | Bartoschek et al. | 55/179 |
| 4,324,564 | 4/1982 | Oliker | 55/20 |
| 4,329,158 | 5/1982 | Sircar | 55/26 |
| 4,336,159 | 6/1982 | Winter | 55/62 X |
| 4,338,101 | 7/1982 | Tuttle | 55/48 |
| 4,351,732 | 9/1982 | Psaras | 55/33 X |
| 4,398,927 | 8/1983 | Asher et al. | 55/34 |
| 4,444,727 | 4/1984 | Yanagihara et al. | 55/68 X |
| 4,472,178 | 9/1984 | Kumar et al. | 55/25 |
| 4,479,814 | 10/1984 | Oliker | 55/162 |
| 4,527,398 | 7/1985 | Schaetzle | 55/179 X |
| 4,582,516 | 4/1986 | Kadi | 55/208 |
| 4,650,575 | 3/1987 | White | 210/183 |
| 4,696,681 | 9/1987 | Lloyd-Williams | 55/28 |
| 4,698,073 | 10/1987 | Rohde et al. | 55/208 X |
| 4,732,579 | 3/1988 | Veltman et al. | 55/23 |
| 4,783,432 | 11/1988 | Settlemyer | 55/33 X |
| 4,830,641 | 5/1989 | White et al. | 55/161 |

FOREIGN PATENT DOCUMENTS

| | | | |
|---|---|---|---|
| 3117310 | 11/1982 | Fed. Rep. of Germany | 55/208 |
| 54-109667 | 8/1979 | Japan | 55/208 |
| 54-114859 | 9/1979 | Japan | 55/208 |
| 55-092122 | 7/1980 | Japan | 55/179 |
| 63-104630 | 5/1988 | Japan | 55/28 |
| 837383 | 6/1981 | U.S.S.R. | 55/179 |

*Primary Examiner*—Robert Spitzer
*Attorney, Agent, or Firm*—Leydig, Voit & Mayer

[57] ABSTRACT

A pressure swing sorption system comprises first and second sorbing chambers each including first and second openings defining a gas flow path between them, a sorbent bed disposed in the gas flow path and having a sorption inlet region near the first opening, and a heater positioned near the sorption inlet region of the sorbent bed. A valve arrangement interconnects an intake, an exhaust, and the first openings of the first and second sorbing chambers and also interconnects an outlet and the second openings of the first and second sorbing chambers. A connecting apparatus connects an energy source external to the first and second sorbing chambers to the heaters of the first and second sorbing chambers. A controller coupled to the valve arrangement and the connecting apparatus simultaneously directs gas from the first sorbing chamber to the outlet and directs a portion of the outlet gas through the second sorbing chamber to the exhaust. The controller also provides energy from the energy source to the heater of the second sorbing chamber to heat the sorption inlet region of the second sorbing chamber as the outlet gas flows through the sorption inlet region.

31 Claims, 5 Drawing Sheets

PRESSURE SWING SORPTION SYSTEM AND METHOD

This application is a continuation of application Ser. No. 07/845,537, filed Mar. 4, 1992, now abandoned, which is a continuation of prior application Ser. No. 07/622,279, filed Dec. 6, 1990, now abandoned, which is a continuation of prior application Ser. No. 07/294,341, filed Jan. 6, 1989, now abandoned.

TECHNICAL FIELD

The present invention relates to systems and methods for removing one or more substances from a gas containing the substances. In particular, it relates to systems and methods which use a sorbent material for sorbing one or more substances from the gas.

BACKGROUND ART

In a variety of commercial and industrial settings it is necessary to remove one or more substances from a gas before the gas can be used for a particular purpose. For example, before compressed air can be used to drive power tools, any water or water vapor must be removed from the compressed gas or the tools will rust. Likewise, before air contaminated with a toxic or noxious substance can be inhaled, the substance must be removed.

Many types of devices are available to remove one or more substances from a gas. One particularly effective class of devices is known as a pressure swing sorption system. Such a system directs a flow of the gas through a bed of sorbent material. A sorbent material is one which sorbs, i.e., absorbs or adsorbs, certain substances. During a sorption phase, the gas containing the substances, i.e., the inlet gas, is directed at a predetermined pressure through a sorbing chamber which contains the sorbent bed and the substances are sorbed by the sorbent material. As the substances are sorbed by the sorbent material, the heat of absorption heats the sorbent bed and this heat is conserved, as taught in U.S. Pat. No. 2,944,627, one of the most widely recognized patents related to pressure swing adsorbers. Because the substances are sorbed by the sorbent material, the outlet gas is free of the substances or has a much lower concentration of the substances.

To extend the useful life of these sorbing systems, a second sorbing chamber with a second sorbent bed is provided. The inlet gas is then redirected from the first sorbing chamber to the second sorbing chamber where the substance is sorbed by the sorbent material in the second sorbing chamber. The sorbent bed in the first sorbing chamber is then regenerated, i.e., purged or stripped of the substances it previously sorbed from the gas. During the regeneration phase, the first sorbing chamber is typically depressurized and a portion of the outlet gas from the second sorbing chamber is directed back through the first sorbing chamber, purging the substances from the sorbent bed. As taught by U.S. Pat. No. 2,944,627, the heat of adsorption induced in the sorbent bed of the first sorbing chamber during the sorption phase is substantially completely utilized to desorb the substance from the sorbent bed during the regeneration phase. The purge gas, now containing much of the substances previously sorbed by the sorbent bed, is then vented through an exhaust. Once the sorbent bed in the first sorbing chamber is sufficiently free of the substances, the first sorbing chamber may be repressurized and the inlet gas may be redirected through the first sorbing chamber while the second sorbing chamber is regenerated. The pressure swing sorption system can continue cycling between the sorption phase and the regeneration phase of the first and second sorbing chambers for an extended period.

As effective as these systems are, they nevertheless have certain undesirable characteristics. For example, the portion of the outlet gas which must be directed back through a sorbing chamber to regenerate the sorbent bed can be very large. For example, from about 15% to about 67% of the inlet gas may be used as purge gas to regenerate a sorbent bed. Consequently, the amount of output gas which can be used for its intended purpose is greatly reduced.

SUMMARY OF THE INVENTION

The present invention provides an improved pressure swing sorption system for sorbing one or more substances from a gas containing the substances. For example, the invention provides a pressure swing sorption system comprising first and second sorbing chambers, an inlet, an outlet, an exhaust, and a valve arrangement. Each sorbing chamber includes first and second openings defining a gas flow path between them, a sorbent bed disposed in the gas flow path and having a sorption inlet region near the first opening, and a heater positioned near the sorption inlet region of the sorbent bed. The valve arrangement interconnects the intake, the exhaust, and the first openings of the first and second sorbing chambers and also interconnects the outlet and the second openings of the first and second sorbing chambers. The pressure swing sorption system further comprises an energy source external to the first and second sorbing chambers, an apparatus for connecting the energy source to the heaters of the first and second sorbing chambers, and a controller coupled to the valve arrangement and the connecting apparatus. The controller simultaneously directs gas from one sorbing chamber to the outlet and directs a portion of the outlet gas through the other sorbing chamber to the exhaust. The controller also provides energy from the energy source to the heater of the other sorbing chamber to heat the sorption inlet region of the other sorbing chamber as the outlet gas flows through the sorption inlet region. The controller is further adapted to cycle between the first and second sorbing chamber according to a NEMA cycle length of less than about 5 minutes, wherein one sorbent bed sorbs at least a portion of the substance form the gas and is heated by the heat of adsorbtion and the other sorbent bed is regenerated using both the energy supplied by the heater and the heat of adsorbtion.

The present invention also provides a pressure swing sorption system comprising first and second sorbing chambers, an intake, an outlet, an exhaust, a valve arrangement, an energy source, and a connecting apparatus identical to those described above. In addition, the sorption system comprises a controller coupled to the valve arrangement and the connecting apparatus. The controller cyclically (a) directs the gas from the intake through the sorbent bed of the first sorbing chamber to the outlet, directs a portion of the outlet gas through the sorbent bed of the second sorbing chamber to an exhaust, and provides energy from the external energy source to the heater of the second sorbing chamber to heat the sorption inlet region as the outlet gas flows through it and (b) directs the gas from the intake through the sorbent bed of the second sorbing chamber to the outlet, directs a portion of the outlet gas through the sorbent bed of the first sorbing chamber to the exhaust, and provides energy from the external energy source to the heater of the first sorbing chamber to heat the sorption inlet region as the outlet gas flows through it. The controller is adapted to cycle between the first and second sorbing chambers according to a NEMA cycle length of less than about 5 minutes, wherein one sorbent bed sorbs at least a portion of the substance from the gas and is heated by the heat of adsorbtion and the other sorbent bed is regenerated using both the energy supplied by the heater and the heat of adsorbtion.

The present invention further provides a method for removing at least a portion of a substance from a gas containing the substance, the method comprising the steps of simultaneously directing the gas through a sorbent bed contained in a first sorbent chamber to an outlet, directing a portion of the outlet gas through a sorbent bed contained in a second sorbing chamber to an exhaust and, providing energy external to the first and second sorbing chambers to a heater near a sorption inlet region of the sorbent bed contained in the second sorbing chamber to heat the sorption inlet region as the outlet gas flows through it. The method further includes the step of cycling between the first and second sorbing chambers according to a NEMA cycle length of less than about 5 minutes, wherein one sorbent bed sorbs at least a portion of the substance from the gas and is heated by the heat of adsorbtion and the other sorbent bed is regenerated by using both the energy supplied by the heater and the heat of adsorbtion.

In addition, the present invention provides a method for removing at least a portion of the substance from a gas containing the substance, the method comprising the steps of cyclically (a) directing the gas from an intake through a sorbent bed in a first sorbing chamber to an outlet, directing a portion of the outlet gas through a sorbent bed contained in a second sorbing chamber to an exhaust, and providing energy from an energy source external to the first and second sorbing chambers to a heater near a sorption inlet region of the sorbent bed in the second sorbing chamber and (b) directing the gas from the intake through the sorbent bed contained in the second sorbing chamber to the outlet, directing a portion of the outlet gas through the sorbent bed contained in the first sorbing chamber to the exhaust, and providing energy from an energy source external to the first and second sorbing chambers to a heater near the sorption inlet region of the sorbent bed in the first sorbing chamber the NEMA cycle length is less than about 5 minutes, one sorbing bed sorbing at least a portion of the substance from the gas and being heated by the heat of adsorption and the other sorbent bed being regenerated using both the energy supplied by the heater and the heat of adsorbtion.

By providing energy from an external energy source to the heater and heating the sorbent inlet region of the sorbent bed and, therefore, the purge gas passing through the sorption inlet region, the capacity of the purge gas to hold the substances is significantly increased. Consequently, far less purge gas is required to regenerate the sorbent bed and much more of the output gas is discharged as purified product, increasing the efficiency of the system. Further, the sorbent bed can be regenerated much more quickly.

DESCRIPTION OF THE EMBODIMENTS

Figure 1:
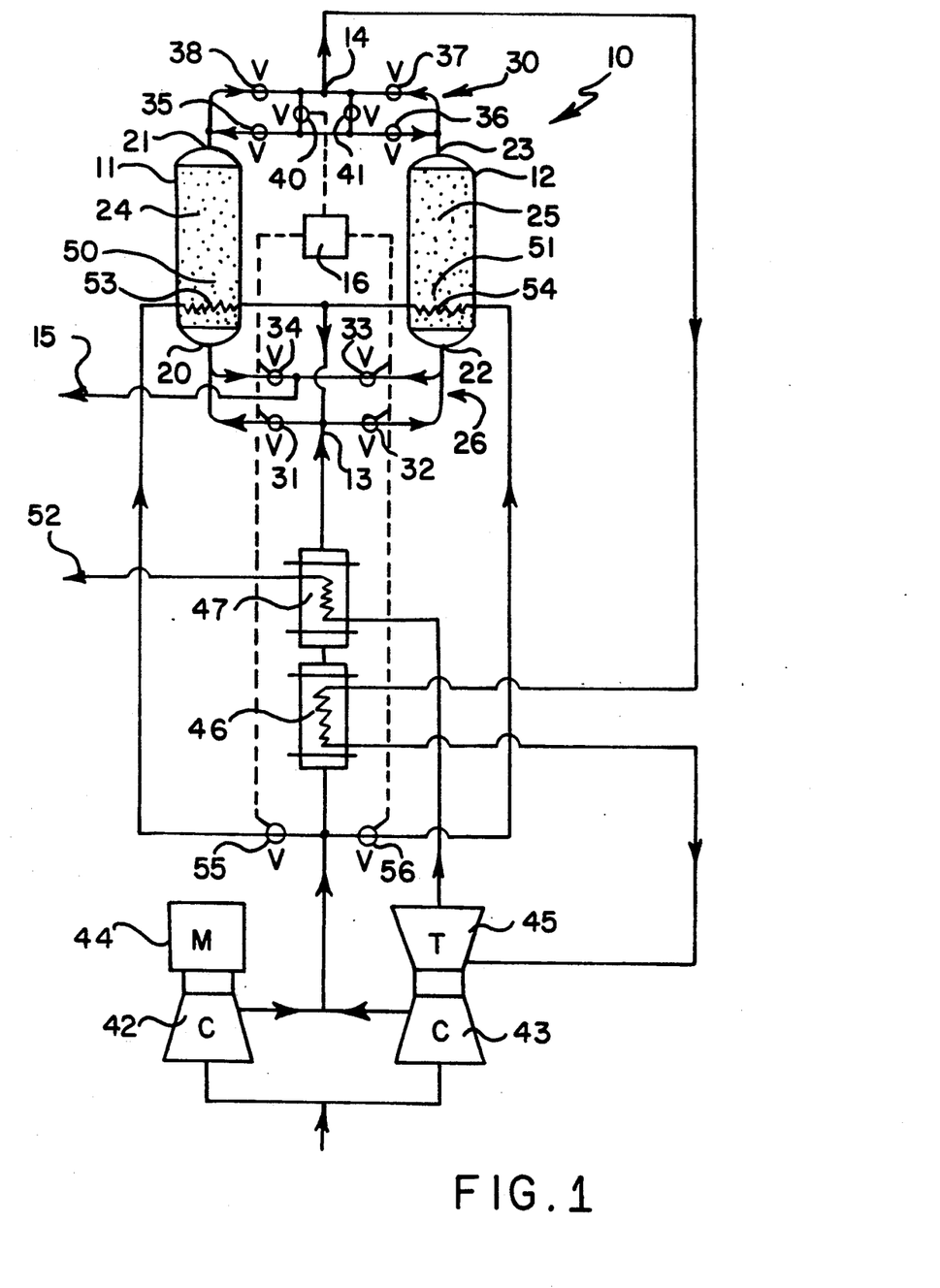
FIG. 1 is a schematic view of a first exemplary pressure swing sorption system embodying the invention.

As shown in FIG. 1, a first exemplary pressure swing sorption system 10 embodying the invention generally comprises first and second sorbing chambers 11, 12, an intake 13, an outlet 14, an exhaust 15, a valve arrangement, and a controller 16. The first and second sorbing chambers 11, 12 are preferably identical. Each sorbing chamber 11, 12 includes first and second openings, 20, 21, 22, 23 defining a gas flow path through the sorbing chamber 11, 12 and a sorbent bed 24, 25 disposed in the gas flow path. Each opening 20, 21, 22, 23 may be a single port or it may be more than one port communicating with the interior of the sorbing chamber 11, 12. The sorbent bed 24, 25 may be composed of any single sorbent material or several sorbent materials suitable for sorbing one or more particular substances from a gas containing the substances. Thus, the application of the pressure swing sorption system may dictate the type of sorbent material in the sorbent bed 24, 25. For example, if the influent gas is wet air to be dried, the sorbent material may be alumina, silica gel, or clinoptilolite. Alternatively, if the influent gas is contaminated air to be purified, the sorbent material may be activated carbon; if the influent gas is air to be enriched in oxygen or in nitrogen, the sorbent material may be a molecular sieve; or, if the influent gas is hydrogen containing hydrocarbons to be removed, the sorbent material may be molecular sieve or carbon. If the sorbent bed is composed of more than one sorbent material, the sorbent materials may be mixed or layered. Further, the sorbent material may be loosely loaded or compressibly loaded into the sorbing chamber 11, 12 or it may be immobilized, for example, where individual particles of the sorbent material are bound to one another in a self-supporting mass.

The valve arrangement generally includes an intake manifold valve structure 26 interconnecting the intake 13, the exhaust 14, and the first openings 20, 22 of the sorbing chambers 11, 12 and an outlet manifold valve structure 30 interconnecting the outlet 14 and the second openings 21, 23 of the sorbing chambers 11, 12. Both the intake manifold valve structure 26 and the outlet manifold valve structure 30 may be configured in a variety of different ways. However, in the first pressure swing sorption system 10, the intake manifold valve structure 26 may comprise first through fourth solenoid valves 31, 32, 33, 34. The outlet manifold valve structure may comprise first through fourth check valves 35, 36, 37, 38, a repressurization solenoid valve 40, and a purge valve assembly 41 which may include an adjustable valve and an orifice.

The controller 16 may also be variously configured. For example, it may comprise a pneumatically or electronically operated system. The electronically operated system may include a microprocessor and associated components for directing the operation of the pressure swing sorption system 10.

Although a pressure swing sorption system embodying the invention has numerous applications, the first exemplary pressure swing sorption system 10 shown in FIG. 1 removes water vapor from compressed air. This application is merely exemplary.

As shown in FIG. 1, air is drawn into a pair of parallel compressors 42, 43 where the air is compressed and heated, for example, to about 100 psig and about 350° F. The first compressor 42 is driven by a motor 44 and the second compressor 43 is driven by a turbine 45. The compressed and heated air leaves the compressors 42, 43 and consecutively passes through first and second aftercoolers 46, 47, where the wet, hot, compressed air may be cooled to, for example, about 100° F. The wet compressed air is then directed to the intake 13 of the pressure swing sorption system 10. From the intake 13, the wet compressed air is directed by the intake manifold valve structure 26 into one of the two sorbing chambers 11, 12. For example, if the controller 16, which is coupled to each of the four solenoid valves 31, 32, 33, 34 of the intake manifold valve structure 26, opens the first and third valves 31, 33 and closes the second and fourth valves 32, 34, the wet compressed air is directed from the intake 13 through the first valve 31 and the first opening 20 into the first sorbing chamber 11.

The wet compressed air enters the first sorbing chamber 11 at a preselected pressure, e.g., about 100psig, and passes through the sorbent bed 24, where the water vapor is sorbed from the compressed air by a sorbent material, such as activated alumina, silica gel, or clinoptilolite. As the water vapor is sorbed by the sorbent material, the heat of adsorption heats the sorbent bed 24. Compressed air containing none of, or a much lower concentration of, water vapor then exits the first sorbing chamber 11 through the second opening 21 and is directed by check valves 35, 36, 37, 38 of the outlet manifold valve structure 30 to the outlet 14.

To regenerate the sorbent bed 24 in the first sorbing chamber 11, the controller 16, after a predetermined length of time, closes the first and third solenoid valves 31, 33 and opens the second and fourth solenoid valves 32, 34 of the intake manifold valve structure 26. The wet compressed air is then directed from the intake 13 through the second valve 32 and the first opening 22 into the second sorbing chamber 12, where the water vapor is sorbed by the sorbent material in the sorbent bed 25 of the second sorbing chamber 12 and the sorbent bed 25 is heated by the heat of adsorption. The dry compressed air then exits the second sorbing chamber 12 through the second opening 23 and is directed by the check valves 35, 36, 37, 38 of the outlet manifold valve structure 30 to the outlet 14.

A portion of this dry compressed air is used as a purge gas and is passed through the purge valve assembly 41, the first check valve 35, the second opening 21 into the first sorbing chamber 11. The first sorbing chamber 11 was depressurized when the fourth solenoid valve 34 was opened by the controller 16, venting the first sorbing chamber 11 via the exhaust 15. In addition, the sorbent bed 24 of the first sorbing chamber 11 was warmed by the heat of adsorption when the wet compressed air was passed through the first sorbing chamber 11, the sorbent bed of a pressure swing sorption system being designed to retain this heat of adsorption. Consequently, when the purge gas passes back through the sorbent bed 24 at the lower pressure, the heat of adsorption is used to evaporate, or desorb, the water vapor from the sorbent bed 24 into the purge gas. The purge gas, then having a high concentration of the water vapor, exits the first sorbing chamber 11 through the first opening 20 and is directed by the solenoid valves 31, 32, 33, 34 of the intake manifold valve structure 26 to the exhaust 15.

Once the sorbent bed 24 in the first sorbent chamber 11 has been sufficiently regenerated, the controller 16 closes the fourth solenoid valve 34. Once the sorbent bed 25 in the second sorbing chamber 12 has sorbed a sufficient amount of water vapor, the controller 16 opens the first and third solenoid valves 31, 33 and closes the second solenoid valve 32. This redirects the wet compressed air through the first sorbing chamber 11 and a portion of the dry compressed air through the second sorbing chamber 12, which repressurizes the first sorbing chamber 11 and regenerates the sorbent bed in the second sorbing chamber 12 using the heat of adsorption induced in the sorbent bed 25. The controller 16 may optionally be coupled to the repressurization solenoid valve 40. To quickly repressurize the first sorbing chamber 11, the controller 16 briefly opens the repressurization valve 40 once the fourth solenoid valve 34 has been opened but before closing the second solenoid valve 32 or opening the first and third solenoid valves 31, 33. The controller 16 cyclically continues, for an extended period, this process of alternately sorbing water vapor from the wet compressed air in the sorbent bed 24 of the first sorbing chamber 11 while regenerating the sorbent bed 25 in the second sorbing chamber 12 and then regenerating the sorbent bed 24 in the first sorbing chamber 11 while sorbing the water vapor from the wet compressed air in the sorbent bed 25 of the second sorbing chamber 12.

The dry compressed gas at the output 14 of the first pressure swing sorption apparatus 10 is directed to the first aftercooler 46, where it is heated, for example, from about 100° F. to about 300° F., and then to the turbine 45, where it cools, for example, to about 50° F. at about 60 psig. From the turbine 45, the dry compressed gas passes through the second aftercooler 47, where it is heated to about 100° F., and then becomes available as product gas at the supply point 52.

In accordance with one aspect of the invention, the pressure swing sorption system further comprises an energy source external to the first and second sorbing chambers and a heater disposed near a sorption inlet region of each sorbing chamber. The sorption inlet region of each sorbing chamber is the region extending from the first opening no further than about one half of the length of the sorbent bed, preferably, no further than about one third of the length of the sorbent bed, and, most preferably, no further than about one fifth of the length of the sorbent bed. A heater is disposed near the sorption inlet region if it is disposed at, in, or in close thermal proximity to the sorption inlet region. By providing energy from the external energy source to the heater and heating the sorption inlet region of the sorbent bed and the purge gas passing through the sorption inlet region, the vapor holding capacity of the purge gas is significantly increased. The thermal energy supplied by the heater assists the heat of adsorption induced in the sorbent bed such that both the thermal energy supplied by the heater and the heat of adsorption are used to regenerate the sorbent bed. In particular, the thermal energy supplied by the heater assists in the regeneration process by reducing the amount of purge gas required to remove the contaminant vapors desorbed by the utilization of the heat of adsorption induced in the sorbent bed during a prior sorption phase. Consequently, far less purge gas is required to regenerate the sorbent bed and much more of the output gas is discharged as purified product gas, increasing the efficiency of the system. Further, the sorbent bed can be regenerated much more quickly.

The external energy source may be any suitable source of energy, such as a source of electrical energy or source of steam, such as a steam generator. However, the preferred external energy source is a source of low grade waste heat because waste heat is inexpensive and because using the waste heat reduces the heat load which must be dissipated. The thermal energy from a heat source may be conveyed to the heater by a heated fluid, either a liquid or a gas.

Figure 5:
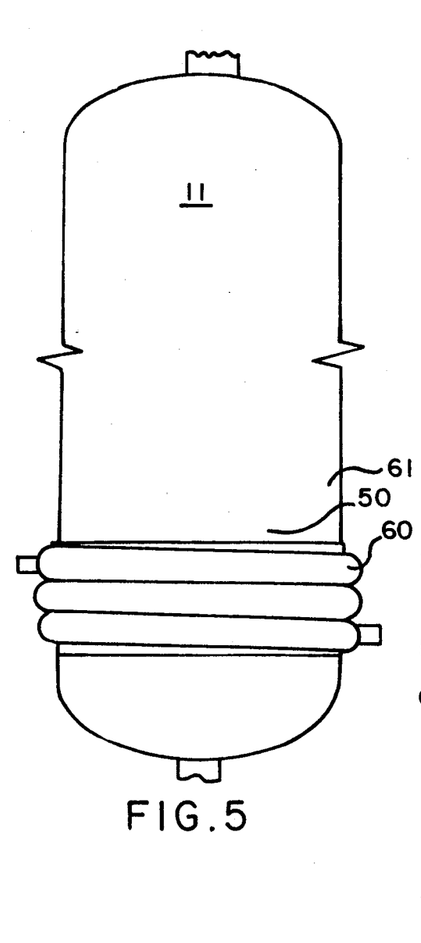
FIG. 5 is an elevation view of the first sorbing chamber of the embodiments of FIGS. 1, 2, and 3.
Figure 6:
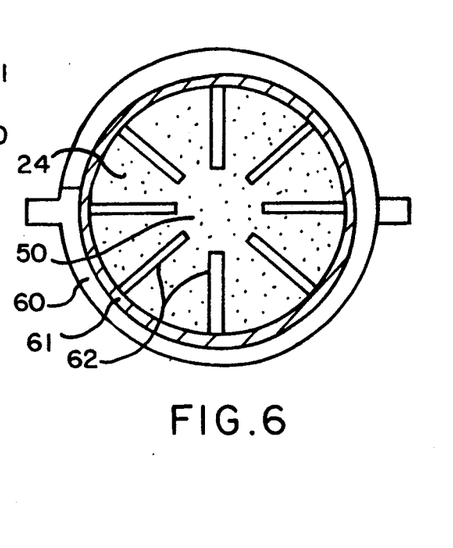
FIG. 6 is a cross-sectional view of FIG. 5 as viewed along lines VI—VI.

The heater may be any suitable device for transferring thermal energy to the sorption inlet region of the sorbent bed. For example, if the external energy source is a source of electrical energy, the heater may include an electric resistance heating element. If the external energy source is a source of thermal energy, the heater may include a heat exchanger. For example, as shown in FIGS. 5 and 6, the first sorbing chamber 11 may include a jacket type of heat exchanger 60 and a heat conductive casing 61, such as a metal casing. The jacket 60 is disposed about the casing 61 near the sorption inlet region 50. The heated fluid is circulated through the jacket 60, heating the jacket 60, the casing 61, and the sorption inlet region 50 of the sorbent bed 24. As shown in FIG. 6, the casing may further include heat conductive vanes 62, such as metal vanes, which extend from the casing 61 radially into the sorption inlet region 50 of the sorbent bed 24. The vanes 62 enable the heat to be transferred more rapidly into the sorption inlet region 50 of the sorbent bed 24. One advantage of the jacket 60 is that it does not require installing any couplings through the casing 61. Consequently, there are no couplings at which the inlet gas or the purge gas might leak from the sorbing chamber 11.

Figure 7:
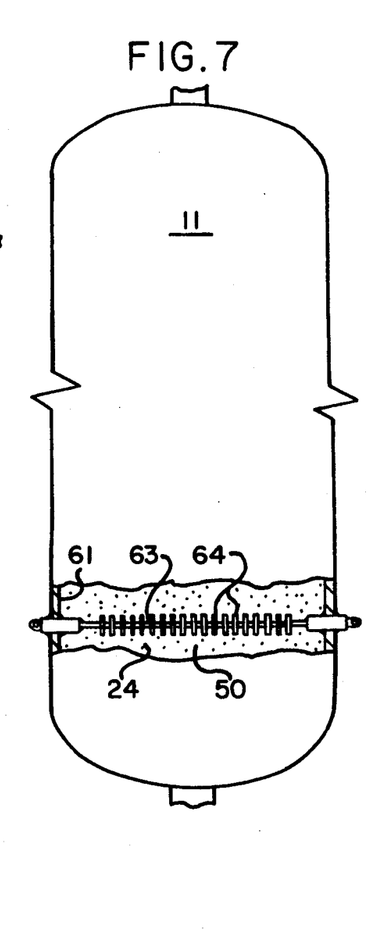
FIG. 7 is an elevation view partially broken away of an alternative first sorbing chamber for the embodiments of FIGS. 1, 2, and 3.
Figure 8:
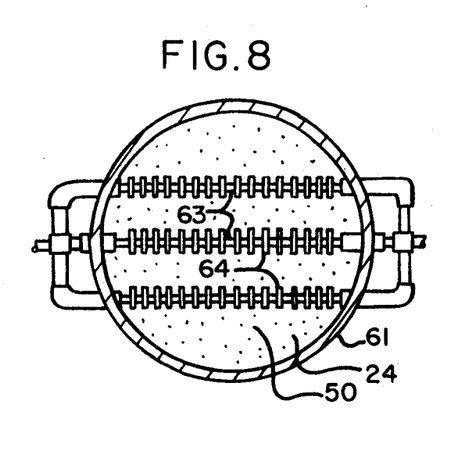
FIG. 8 is a sectional view of FIG. 7 as viewed along lines VIII—VIII.

For another example, as shown in FIGS. 7 and 8, the first sorbing chamber 11 may include a tube type of heat exchanger 63, including at least one and preferably several tubes. The tubes 63 extend through the casing 61 and preferably have fins 64 which better enable the heat exchanger to transfer heat to the sorption inlet region 50 of the sorbent bed 24. The heated fluid is passed through the tubes 63, heating the tubes 63, the fins 64, and the sorption inlet region 50 of the sorbent bed 24. One advantage of the finned tubes 63 is that they are in more direct contact with the sorbent bed 24 and, therefore, heat the sorption inlet region 50 of the sorbent bed 24 in less time with less heat loss.

As one example of an external low grade waste heat source, the energy source for the first pressure swing sorption system 10 comprises the parallel compressors 42, 43. The heaters 53, 54 in the first and second sorbing chambers 11, 12 preferably comprise heat exchangers, and the thermal energy provided between the compressors 42, 43 and the heat exchangers 53, 54 is provided by the hot, wet compressed air itself. For example, before the first aftercooler 46, at least a portion, e.g., 1%, of the hot, wet compressed air may be alternately directed through first and second switching valves 55, 56 to the heat exchanger 53, 54 in the first and second sorbing chambers 11, 12 and then to the intake 13. The controller 16 is coupled to the switching valves 55, 56 and opens one of them in time for the sorption inlet region 50, 51 of the appropriate sorbent bed 24, 25 to be warm as the purge gas is passed through the sorbing chamber 11, 12 during the regeneration phase. The controller 16 closes the switching valve 55, 56 in time for the sorption inlet region 50, 51 of the sorbent bed 24, 25 to be cool as the wet compressed air is passed through the sorbing chamber 11, 12 during the sorption phase.

The location of the heater is important. Heating the sorption inlet regions of the first and second sorbing chambers is most advantageous because it is this region of the sorbent bed which has the highest concentration of the sorbed substance. Consequently, the heater is located near the sorption inlet region. Heating the region of the sorbing chamber 11, 12 between the sorption inlet region 50, 51 and the second opening 21, 23 is relatively ineffective. The concentration of the sorbed substance is much lower in this region and the purge gas cools as it travels from this region into the sorption inlet region 50, 51, reducing the vapor holding capacity of the purge gas. Heating the purge gas before it enters the sorbing chamber 11, 12 is even more ineffective. The purge gas transfers most of its heat to the region of the sorbing chamber 11, 12 between the sorbing inlet region 50, 51 and the second opening 21, 23 where the concentration of the sorbed substance is relatively low. By the time the purge gas reaches the sorption inlet region 50, 51, it is relatively cool. Consequently, the vapor holding capacity of the purge gas is lowest where the concentration of the sorbed substance is highest.

The amount of heating may vary. For example, elevating the purge gas exhaust temperature by about 5° F. to about 20° F. by heating the sorption inlet region significantly reduces the amount of purge gas required to regenerate the sorbent bed 24, 25. Elevating the purge gas exhaust temperature by 20° F. enables the purge gas to nearly double its vapor holding capacity, reducing the quantity of purge gas by a factor of 2. Elevating the purge gas exhaust temperature by 40° F. quadruples the vapor holding capacity of the purge gas, reducing the quantity of purge gas required by a factor of 4. Elevating the temperature in excess of about 40° F. to about 60° F. may be detrimental because it may be difficult to adequately cool the sorption inlet region 50, 51 before the sorption phase begins, reducing the sorption capacity of the sorbent material and yielding a poorer quality outlet gas.

The timing of the heating, e.g., the timing of the opening and closing of the switching valves by the controller, depends on several factors, including the temperature and heat capacity of the heated fluid supplied to the heat exchanger, the heat transfer rate from the heat exchanger to the sorption inlet region of the sorbent bed, and the cycle time of the pressure swing sorption system. For pressure swing sorption systems having a long NEMA cycle, e.g., greater than 5 minutes, the appropriate switching valve may be opened at about the same time that the purge gas is directed through the sorbing chamber and closed when the sorbing chamber is repressurized. Such long cycles provide adequate time for the heated fluid to reach the heat exchanger and for the thermal energy to flow from the heat exchanger into the sorption inlet region of the sorbent bed and heat the sorbent bed as the purge gas flows through it during the regeneration phase. Such long cycles also provide adequate time for the thermal energy to dissipate as the wet compressed air flows through the sorbing chamber during the sorption phase. For pressure swing sorption systems having a short NEMA cycle, e.g., less than 30 seconds, it may be preferable to open the appropriate switching valve somewhat before the purge gas is directed through the sorbing chamber so the sorption inlet region has sufficient time to warm. It may also be preferable to close the appropriate switching valve somewhat before the purge gas is redirected to the other sorbing chamber so the sorption inlet region has sufficient time to cool. For pressure swing sorption systems having short NEMA cycles, the preferred heat exchanger is the finned tube type heat exchanger and the preferred heated fluid is a coolant such as water.

Figure 2:
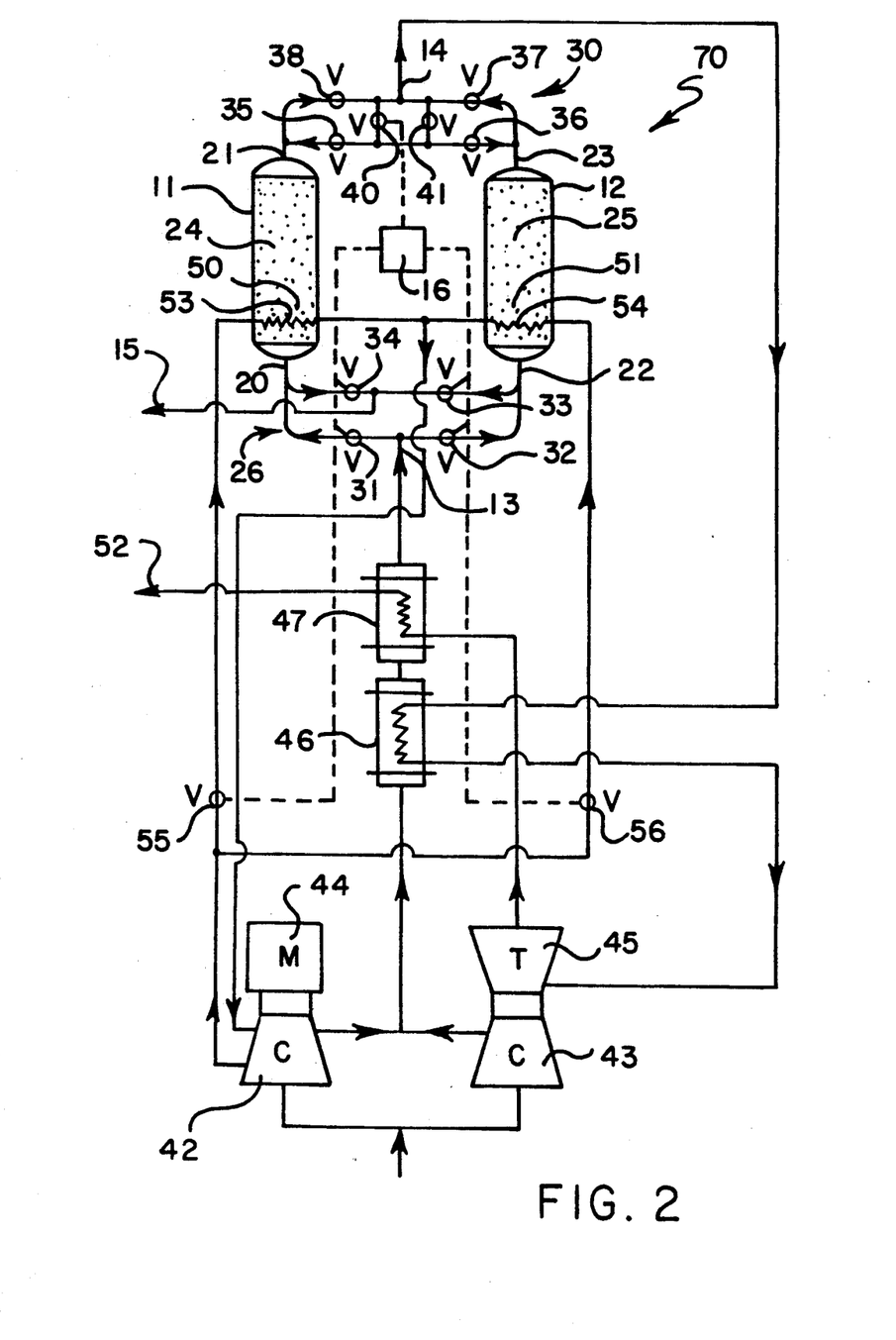
FIG. 2 is a schematic view of a second exemplary pressure swing sorption system embodying the invention.

As shown in FIG. 2, a second exemplary pressure swing sorption system 70 provides a coolant or lubricating oil as the heated fluid instead of the hot, wet compressed air. The second exemplary pressure swing sorption system 70 is very similar to the first exemplary pressure swing sorption system 10. The first compressor 42 is again the external energy source. However, the cooling system or the lubricating system of the first compressor 42 provides the heated fluid. Under control of the controller 16, hot coolant or hot lubricating oil is supplied from the compressor 42 through the first or second switching valve 55, 56 to the heat exchanger 53, 54 in the first or second sorbing chamber 11, 12 and back to the compressor 42.

Figure 3:
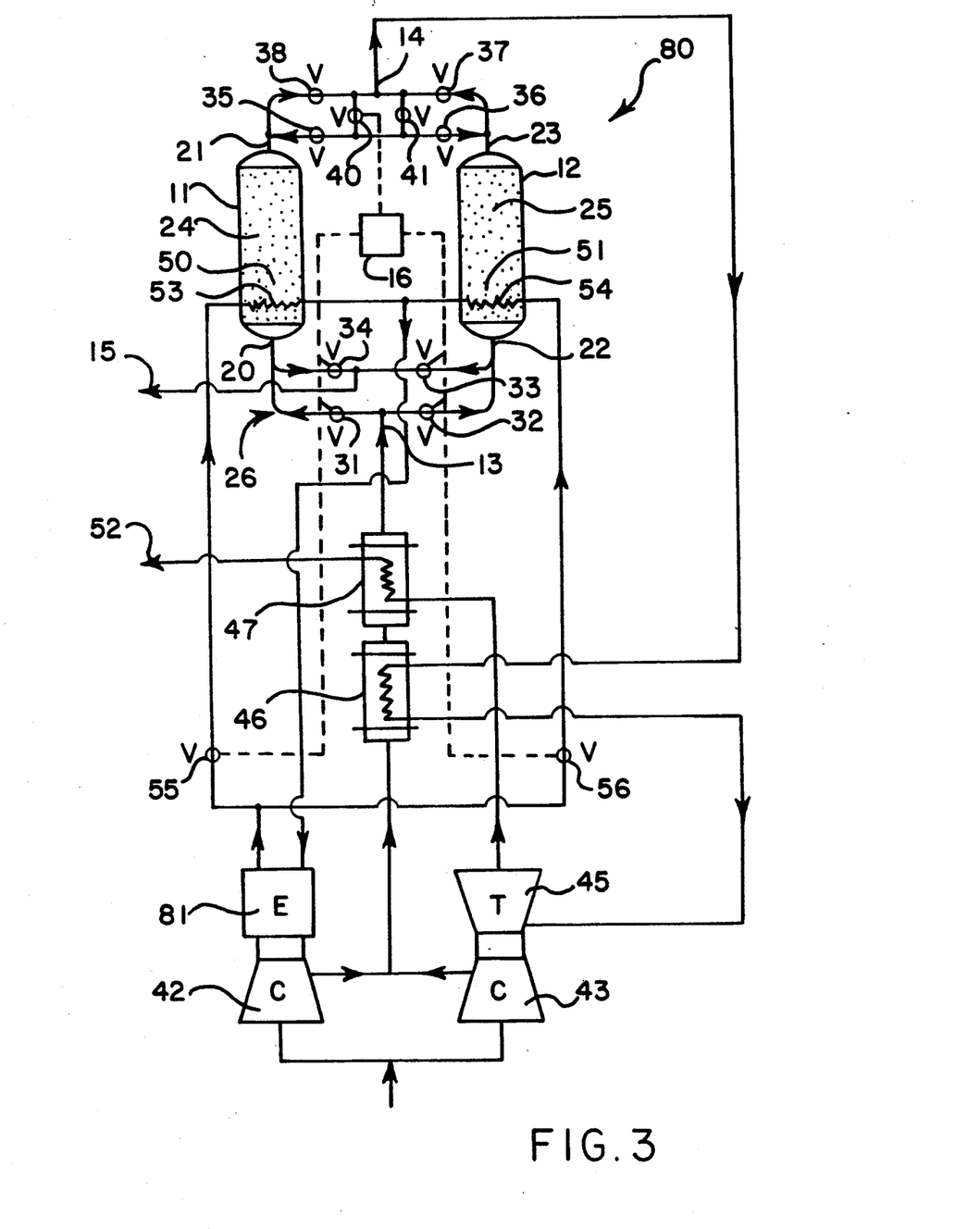
FIG. 3 is a schematic view of a third exemplary pressure swing sorption system embodying the invention.

A third exemplary pressure swing sorption system 80 shown in FIG. 3 also provides a coolant or a lubricating oil as the heated fluid. The third exemplary pressure swing sorption system 80 is very similar to the second exemplary pressure swing sorption system 70. However, the first compressor 42 is driven by an engine 81, for example, an internal combustion engine, rather than a motor, and the engine 81 is the external energy source. Again, under the control of the controller 16, the cooling system or the lubricating system or an exhaust system of the engine provides a hot coolant or a hot lubricating oil or a hot exhaust gas from the engine 81 through the first or second switching valves 55, 56 to the first or second heat exchangers 53, 54 and back to the engine 81.

Figure 4:
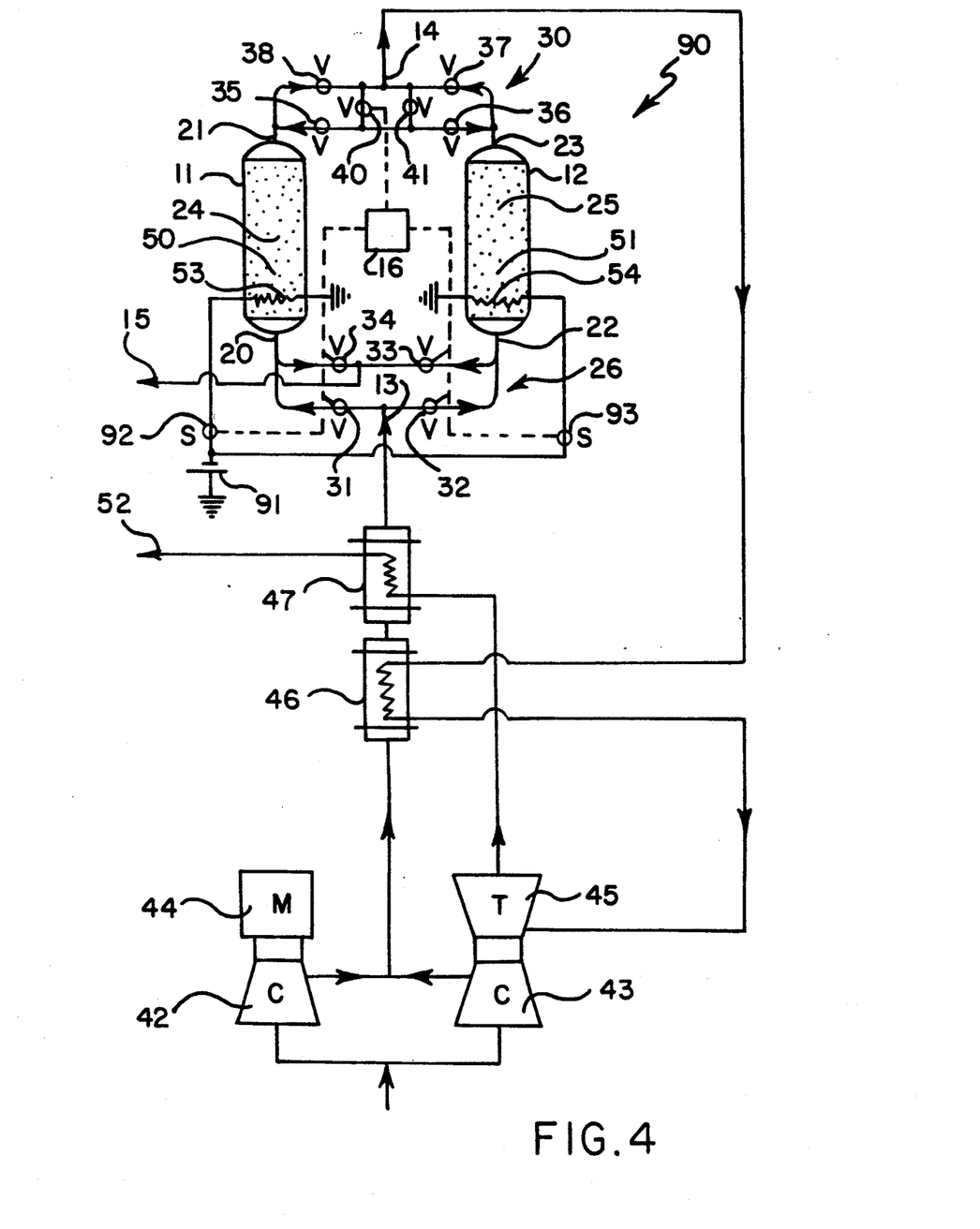
FIG. 4 is a schematic view of a fourth exemplary pressure swing sorption system embodying the invention.

A fourth exemplary pressure swing sorption system 90 shown in FIG. 4 is similar to the first exemplary pressure swing sorption system 10. However, the external energy source is a source of electrical energy 91, such as a source of direct current or alternating current. If the motor 44 is electrically driven, the electrical energy source 91 could conveniently be the same source which drives the motor 44. The heaters 53, 54 may include electrical resisting heating elements.

Although the present invention has been described in terms of several particular embodiments, it is not limited to these embodiments. Alternative embodiments and modifications which would still be encompassed by the invention may be made by those skilled in the art, particularly in light of the foregoing teachings. Therefore, the following claims are intended to cover any alternative embodiments, modifications, or equivalents which may be included within the spirit and scope of the invention as defined by the claims.

I claim:

1. A pressure swing sorption process for removing at least a portion of a substance from a gas containing the substance, the method comprising the steps of:
   simultaneously directing the gas through a sorbent bed contained in a first sorbing chamber to an outlet, directing a portion of the outlet gas through a sorbent bed contained in a second sorbing chamber to an exhaust, and providing energy from an energy source external to the sorbent beds of the first and second sorbing chambers to a heater near a sorption inlet region of the sorbent bed contained in the second sorbing chamber to heat the sorption inlet region as the outlet gas flows therethrough and
   cycling between the first and second sorbing chambers according to a NEMA cycle length of less than about 5 minutes wherein one sorbent bed sorbs at least a portion of the substance from the gas and is heated by the heat of adsorption and the other sorbent bed is regenerated using both the energy supplied by the heater and the heat of adsorption.

2. The method of claim 1 further comprising the step of depressurizing the second sorbing chamber as the outlet gas flows through the sorbent bed in the second sorbing chamber.

3. The pressure swing sorption process of claim 1 wherein providing energy from the energy source to the heater includes elevating the exhaust temperature of the gas flowing through the sorbent bed being regenerated by less than about 60° F.

4. The pressure swing sorption process of claim 3 wherein providing energy from the external energy source to the heater includes elevating the exhaust temperature of the gas flowing through the sorbent being regenerated by less than about 20° F.

5. A pressure swing sorption process for removing at least a portion of a substance from a gas containing the substance, the method comprising the steps of cyclically:
   (a) directing the gas from an intake through a sorbent bed in a first sorbing chamber to an outlet, directing a portion of the outlet gas through a sorbent bed contained in second sorbing chamber to an exhaust, and providing energy from an energy source external to the first and second sorbing chambers to a heater near a sorption inlet region of the sorbent bed in the second sorbing chamber and
   (b) directing the gas from the intake through the sorbent bed contained in the second sorbing chamber to the outlet, directing a portion of the outlet gas through the sorbent bed contained in the first sorbing chamber to the exhaust, and providing energy from an energy source external to the first and second sorbing chambers to a heater near the sorption inlet region of the sorbent bed in the first sorbing chamber,
   wherein the NEMA cycle length is less than about 5 minutes and wherein one sorbent bed sorbs at least a portion of the substance from the gas and is heated by the heat of adsorption and the other sorbent bed is regenerated using both the energy supplied by the heater and the heat of adsorption.

6. The method of claim 5 further comprising the step of depressurizing the sorbing chambers as the portion of the outlet gas flows therethrough.

7. The pressure swing sorption process of claim 5 wherein providing energy from the energy source to the heater includes elevating the exhaust temperature of the gas flowing through the sorbent bed being regenerated by less than about 60° F.

8. The pressure sorption process of claim 7 wherein providing energy from the external energy source to the heater includes elevating the exhaust temperature of the gas flowing through the sorbent bed being regenerated by less than about 20° F.

9. A pressure swing sorption system for removing at least a portion of a substance from a gas containing the substance, the sorption system comprising:
   first and second sorbing chambers, each sorbing chamber including first and second openings defining a gas flow path between the first and second openings, a sorbent bed disposed in the gas flow path and having a sorption inlet region near the first opening, and a heater positioned near the sorption inlet region of the sorbent bed;
   an energy source external to the sorbent beds of the first and second sorbing chambers;
   means for connecting the energy source to the heaters of the first and second sorbing chambers;
   an intake, an outlet, and an exhaust;
   a valve arrangement interconnecting the intake, the exhaust, and the first openings of the first and second sorbing chambers and interconnecting the outlet and the second openings of the first and second sorbing chambers; and
   a controller coupled to the valve arrangement and the connecting means for simultaneously directing gas through one sorbing chamber of the outlet, directing a portion of the outlet gas through the other sorbing chamber to the exhaust, and providing energy from the external energy source to the heater of said other sorbing chamber to heat the sorption inlet region of said other sorbing chamber as the outlet gas flows through the sorption inlet region, wherein the controller is adapted to cycle between the first and second sorbing chambers according to a NEMA cycle length of less than about 5 minutes and wherein one sorbent bed sorbs at least a portion of the substance from the gas and is heated by the heat of adsorption and the other sorbent bed is regenerated using both the energy supplied by the heater and the heat of adsorption.

10. The pressure swing sorption system of claim 9 wherein the controller is coupled to the valve arrangement for depressurizing said other sorbing chamber as the portion of the outlet gas flows through that sorbing chamber.

11. The pressure swing sorption system of claim 9 wherein the energy source includes a source of electrical energy and each heater includes an electric heating element.

12. The pressure swing sorption system of claim 9 wherein the energy source includes a heat source, each heater includes a heat exchanger, and the connecting means includes a second valve arrangement interconnecting the heat source and the heat exchangers for directing a heated fluid from the heat source to the heat exchangers.

13. The pressure swing sorption system of claim 12 the heat source comprises a gas compressor.

14. The pressure swing sorption system of claim 13 wherein the gas compressor has a compressed gas outlet coupled to the intake and coupled to the heat exchangers via the second valve arrangement for supplying at least a portion of the compressed gas to the heat exchangers.

15. The pressure swing sorption system of claim 13 wherein the gas compressor has a lubricating oil system coupled to the heat exchangers via the second valve arrangement for supplying heated lubricating oil to the heat exchangers.

16. The pressure swing sorption system of claim 13 wherein the gas compressor includes a coolant system coupled to the heat exchangers via the second valve arrangement for supplying heated coolant to the heat exchangers.

17. The pressure swing sorption system of claim 12 wherein the heat source comprises an engine.

18. The pressure swing sorption system of claim 17 wherein the engine includes a lubricating oil system coupled to the heat exchangers via the second valve arrangement for supplying heated oil to the heat exchangers.

19. The pressure swing sorption system of claim 17 wherein the engine includes a coolant system coupled to the heat exchangers via the second valve arrangement for supplying heated coolant to the heat exchangers.

20. The pressure swing sorption system of claim 17 wherein the engine includes an exhaust system coupled to the heat exchangers via the second valve arrangement for supplying hot exhaust gas to the heat exchangers.

21. The pressure swing sorption system of claim 12 wherein each heat exchanger includes at least one tube extending through the sorption inlet region of the sorbent bed.

22. The pressure swing sorption system of claim 21 wherein the tube includes heat dissipating fins.

23. The pressure swing sorption system of claim 12 wherein each heat exchanger includes a jacket disposed about the sorption inlet region of the sorbent bed.

24. The pressure swing sorption system of claim 23 wherein each sorbing chamber further includes a heat conductive casing and heat conducting vanes extending radially from the casing into the sorption inlet region of the sorbent bed.

25. The pressure swing sorption system of claim 24 wherein the heater elevates the exhaust temperature of the gas flowing through the sorbent bed being regenerated by less than about 20° F.

26. The pressure swing sorption system of claim 9 wherein each sorbent bed comprises at least one of a group of sorbent materials consisting of activated alumina, clinoptilolite, molecular sieve, and carbon.

27. The pressure swing sorption system of claim 9 wherein the sorption inlet region of each sorbent bed extends from the first opening of the sorbing chamber no further than one fifth the length of the sorbent bed.

28. The pressure swing sorption system of claim 9 wherein the heater elevates the exhaust temperature of the gas flowing through the sorbent bed being regenerated by less than about 60° F.

29. The pressure swing sorption system of claim 28 wherein the heater elevates the exhaust temperature of the gas following through the sorbent bed being regenerated by less than about 20° F.

30. A pressure swing sorption system for removing at least a portion of a substance from a gas containing the substance, the sorption system comprising:
- first and second sorbing chambers, each sorbing chamber including first and second openings defining a gas flow path between the first and second openings, a sorbent bed disposed in the fluid flow path and having a sorption inlet region near the first opening, and a heater positioned near the sorption inlet region of the sorbent bed;
- an energy source external to the sorbent beds of the first and second sorbing chambers;
- means for connecting the energy to the heaters of the first and second sorbing chambers;
- an intake, an outlet, and an exhaust;
- a valve arrangement interconnecting the intake, the exhaust, and the first openings of the first and second sorbing chambers and interconnecting the outlet and the second openings of the first and second sorbing chambers; and
- a controller coupled to the valve arrangement and the connecting means for cyclically (a) directing the gas from the intake through the sorbent bed of the first sorbing chamber to the outlet, directing a portion of the outlet gas through the sorbent bed of the second sorbing chamber to an exhaust, and providing energy from the external energy source to the heater of the second sorbing chamber to heat the sorbing inlet region as the outlet gas flows therethrough and (b) directing the gas from the intake through the sorbent bed of the second sorbing chamber to the outlet, directing a portion of the outlet gas through the sorbent bed of the first sorbing chamber to the exhaust, and providing energy from the external energy source to the heater of the first sorbing chamber to heat the sorption inlet region as the outlet gas flows therethrough, wherein the controller is adapted to cycle between the first and second sorbing chambers according to a NEMA cycle length of less than about 5 minutes and wherein one sorbent bed sorbs at least a portion of the substance from the gas and is heated by the heat of adsorption and the other sorbent bed is regenerated using both the energy supplied by the heater and the heat of adsorption.

31. The pressure swing sorption system of claim 30 wherein the heater elevates the exhaust temperature of the gas flowing through the sorbent bed being regenerated by less than about 60° F.

* * * * *